(12) United States Patent
Charbonneau et al.

(10) Patent No.: US 8,665,973 B2
(45) Date of Patent: Mar. 4, 2014

(54) REMOVAL OF A BAND-LIMITED DISTRIBUTED PILOT FROM AN OFDM SIGNAL

(75) Inventors: Terrance W. Charbonneau, Fort Wayne, IN (US); John P. Johnston, Fort Wayne, IN (US); Bruce E. Reidenbach, Albion, IN (US); Gregory T. Barnett, Fort Wayne, IN (US)

(73) Assignee: Exelis Inc., McLean, VA (US)

( * ) Notice: Subject to any disclaimer, the term of this patent is extended or adjusted under 35 U.S.C. 154(b) by 241 days.

(21) Appl. No.: 13/362,794

(22) Filed: Jan. 31, 2012

(65) Prior Publication Data
US 2013/0195227 A1    Aug. 1, 2013

(51) Int. Cl.
*H04L 27/28* (2006.01)
(52) U.S. Cl.
USPC ........................................................ 375/260
(58) Field of Classification Search
USPC .................................................. 375/260, 316
See application file for complete search history.

(56) References Cited

U.S. PATENT DOCUMENTS

| | | | |
|---|---|---|---|
| 5,471,534 A * | 11/1995 | Utter | 381/4 |
| 2003/0016773 A1 * | 1/2003 | Atungsiri et al. | 375/355 |
| 2006/0028976 A1 | 2/2006 | Park et al. | |
| 2009/0060075 A1 | 3/2009 | Mohebbi | |
| 2013/0018622 A1 * | 1/2013 | Samarasooriya et al. | 702/111 |

OTHER PUBLICATIONS

Non-Published, co-pending U.S. Appl. No. 13/314,651, filed Dec. 8, 2011.
Non-Published, co-pending U.S. Appl. No. 13/562,724, filed Jul. 31, 2012.
Non-Published, co-pending U.S. Appl. No. 13/314,695, filed Dec. 8, 2011.

* cited by examiner

*Primary Examiner* — Emmanuel Bayard
(74) *Attorney, Agent, or Firm* — Edell, Shapiro & Finnan, LLC

(57) ABSTRACT

A technique for removing a band-limited distributed pilot signal from an orthogonal frequency division multiplexed (OFDM) signal involves converting a received OFDM signal, which includes a distributed pilot signal and an OFDM data signal, into a frequency domain signal having populated frequency bins containing respective subcarrier signals, each including a constituent data signal of the OFDM data signal and component pilot signal of the distributed pilot signal. An average magnitude of the populated frequency bins is determined based on the absolute values of the complex components of the populated frequency bins of the frequency domain signal, and the average magnitude of the populated frequency bins is used to estimate a pilot signal magnitude. The distributed pilot signal is removed from the frequency domain signal using a stored replica of the pilot signal scaled in conjunction with the pilot signal magnitude to yield the OFDM data signal.

20 Claims, 7 Drawing Sheets

REMOVAL OF A BAND-LIMITED DISTRIBUTED PILOT FROM AN OFDM SIGNAL

BACKGROUND

Orthogonal Frequency Division Multiplexed (OFDM) transmission schemes are widely used in digital communications, including wireless networking, television and audio broadcasting, and internet access. In an OFDM scheme, the overall system bandwidth is partitioned into a number of orthogonal subcarrier frequencies, commonly referred to as tones. A stream of informational bits is converted to a series of frequency-domain symbols, and these symbols are transmitted over the subcarrier frequencies. Each subcarrier is modulated with a modulation scheme, such as quadrature amplitude modulation (QAM) or some form of phase-shift keying (PSK). OFDM is used in the IEEE 802.11 wireless local area networking standards.

Many techniques have been proposed to transmit pilot signals along with OFDM signals to allow receivers to estimate channel characteristics. One option is to add a distributed pilot channel probe to OFDM data being transmitted. When an OFDM transmitter adds a distributed pilot channel probe on top of OFDM data, the receiver must remove the distributed pilot signal before demodulating the data. Existing techniques for removal of a distributed pilot signal often require complex, iterative time domain estimation algorithms to separate the distributed pilot channel probe from the OFDM data. Accordingly, there remains a need for a more efficient way to remove distributed pilot signals from OFDM signals at a receiver.

SUMMARY

Described herein is a technique for removing a band-limited distributed pilot signal from an orthogonal frequency division multiplexed (OFDM) signal. A received OFDM signal comprising a band-limited distributed pilot signal and an OFDM data signal is converted into a frequency domain signal comprising a plurality of populated frequency bins containing respective subcarrier signals each including a constituent data signal of the OFDM data signal and component pilot signal of the distributed pilot signal. An average magnitude of the populated frequency bins is determined and used to estimate the pilot signal magnitude based on a predetermined relationship between the magnitudes of the data and pilot signals. The distributed pilot signal is removed from the frequency domain signal based on the determined pilot signal magnitude and the known pilot signal structure to yield the OFDM data signal.

A receiver implementing the pilot signal removal technique described herein separates the band-limited distributed pilot signal from the received OFDM signal in the frequency domain and does not require complex, iterative time domain estimation algorithms to separate the distributed pilot channel probe from the received OFDM data. This technique requires only simple averaging at the receiver, avoiding the far greater processing resources required for complex time domain estimation algorithms.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

Described herein is a new technique for removing an OFDM distributed pilot channel probe from OFDM data in the frequency domain, in which the OFDM receiver averages received FFT signal components to determine how much of the received signal constitutes the OFDM data signal in order to determine the magnitude of the pilot signal. The OFDM receiver combines this magnitude information with knowledge of the pilot waveform structure to remove the distributed pilot channel probe from the received OFDM signal.

A distributed pilot signal transmitted from a source transmitter is useful for obtaining a channel estimate, preferably by performing at the receiver a relatively simple, one-pass correlation that does not require complex hardware or processing. Thus, it is desirable to construct a band-limited pilot signal with autocorrelation properties that are as good as possible. At the receiver, the distributed pilot signal is essentially some time-domain pseudo-noise sequence that is identifiable to the receiver. With a pilot signal generated in the time domain, the receiver may be required to do both time domain and frequency domain processing to acquire the desired information from the pilot signal. For example, the receiver might detect the pilot signal by performing a correlation in the time domain. Once the pilot signal is detected, the receiver might perform an FFT on the pilot signal and then take the information acquired in the time domain and perform some form of transformation and removal in the frequency domain. With a distributed pilot signal generated in the frequency domain, the receiver can perform a single FFT without the need for time-domain processing of the pilot signal to recover the desired information, thereby simplifying the receiver design.

An OFDM receiver implementing the pilot removal technique described herein does not require complex, iterative time domain estimation algorithms to separate the distributed pilot channel probe from the OFDM data. Since both the distributed pilot and data are initially constructed in the OFDM transmitter in the frequency domain, they can be separated in the OFDM receiver in the frequency domain. This technique requires only simple averaging at the OFDM receiver, avoiding the far greater processing resources required for complex time domain estimation algorithms.

Figure 1:
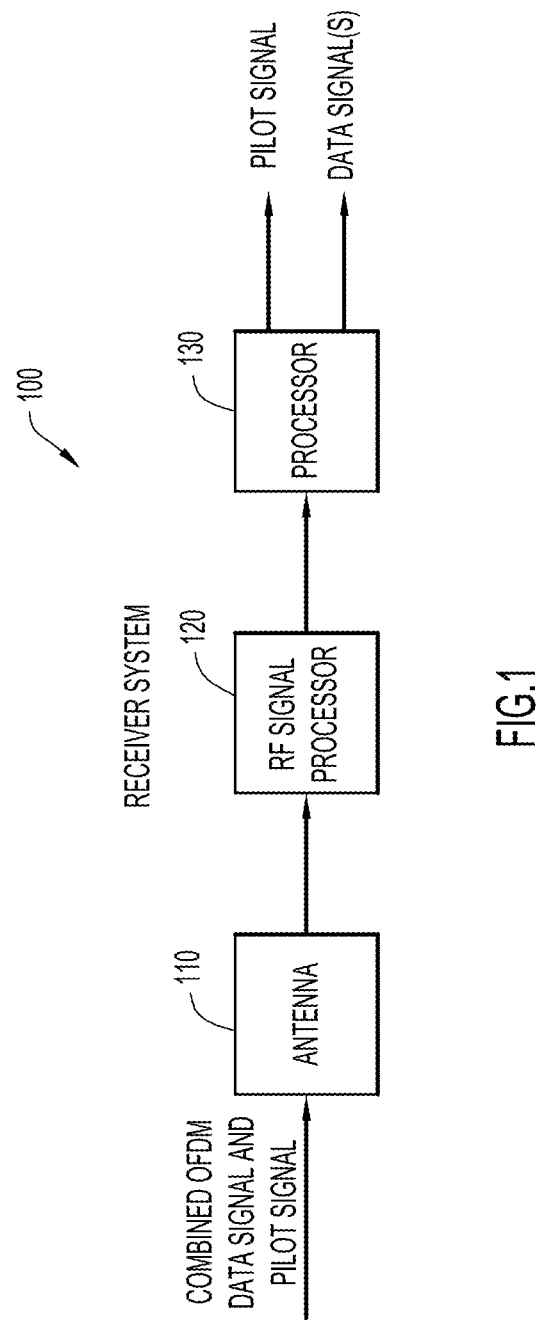
FIG. 1 is a top level block diagram of a receiver system for removing a band-limited distributed pilot signal from an OFDM signal.

FIG. 1 is a top level block diagram of a receiver system 100 capable of performing removal of a distributed pilot signal from an OFDM signal. Receiver system 100 includes an antenna 110, which can comprise one or more antenna elements, for receiving an OFDM data signal combined with an OFDM distributed pilot channel probe (pilot signal). Antenna 110 supplies the received RF signal to an RF signal processor 120 that performs operations (e.g., amplification, automatic gain control (AGC), down-conversion, A/D conversion, etc.) to convert the received RF signal to a signal suitable for processing by a processor 130. The architecture depicted in FIG. 1 is conceptual to illustrate major functional units, and does not necessarily illustrate physical relationships or imply any specific implementation. The processor portion of receiver system 100 that performs the operations described herein can be implemented in hardware, firmware, software, or any combination of hardware, firmware, and software, and may include one or more processor devices and/or one or more software modules. For example, certain functional blocks or operations can be implemented using a processor executing program instructions (software) stored in a storage or memory unit to carry out operations. Thus, at least some of the operations and methodologies described herein can be carried out by executing instructions stored on a non-transitory computer readable medium (i.e., software) on a processor or processors. As used herein, the term "computer readable medium" refers to non-transitory (tangible) media (e.g., a memory or storage device).

Figure 2:
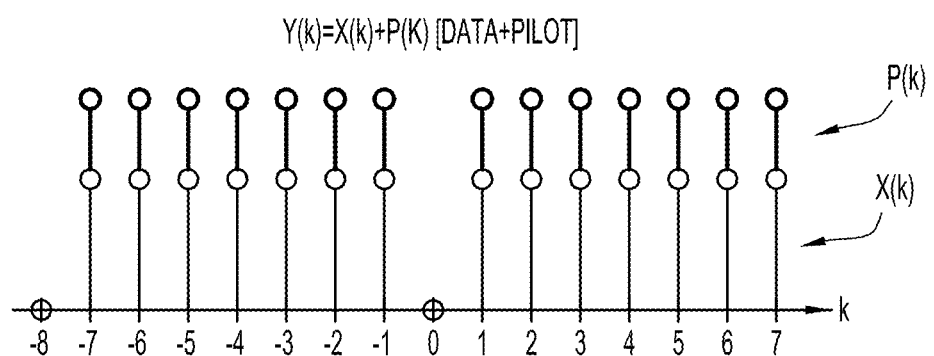
FIG. 2 is a graph illustrating an FFT signal in which the same frequency bins used for transmission of OFDM subcarriers are also used for transmission of a band-limited distributed pilot signal.

FIG. 2 illustrates a frequency domain representation of an example OFDM signal having suitable characteristics for application of the pilot signal removal techniques described herein. The transmitted OFDM signal $Y_T(k)$ contains both an OFDM data signal $X(k)$ and a distributed channel probe pilot signal $P(k)$. The OFDM signal can be constructed by generating at the transmitter the OFDM data signal $X(k)$ in the frequency domain, e.g., as an FFT, with subcarriers of the OFDM signal formed at individual frequency bins of the FFT, as shown in FIG. 2. In this context, the variable k refers to a particular frequency bin within the FFT. The channel probe pilot signal $P(k)$ can also be generated at the transmitter in the frequency domain, e.g., as an FFT. The distributed pilot signal comprises a set of component pilot signals, with individual component pilot signals being formed at respective frequency bins of the FFT.

The frequency domain OFDM data signal $X(k)$ and the frequency domain distributed pilot signal $P(k)$ can be combined in the frequency domain at the transmitter, resulting in the combined OFDM frequency domain signal shown in FIG. 2. More specifically, the FFT that constitutes the frequency domain OFDM data signal $X(k)$ is summed, bin by bin, with the FFT that constitutes the frequency domain distributed pilot signal $P(k)$, such that a combined FFT signal $Y_T(k)$ containing both the data and pilot signals is generated at the transmitter, where:

$$Y_T(k) = X(k) + P(k) \quad (1)$$

In effect, individual components of the distributed pilot signal are added to individual constituent data signals on a subcarrier-by-subcarrier basis. In this case, the value of the data signal is added to the value of the pilot signal on a bin-by-bin basis, where the amplitude of the pilot signal is less than the amplitude of the data signal in each bin. In the example of a 16-point FFT shown in FIG. 1, each of numbered bins k=1 through 7 and −1 through −7 of the combined FFT is "populated" with both a discrete sub-carrier of the OFDM data signal and a component of the distributed pilot signal, such that every frequency bin within a band-limited constraint is used to transmit both data and pilot signals (all available subcarriers within a selected bandwidth transport the data and pilot signals). Stated another way, a component of the distributed pilot signal is present in the combined frequency domain signal at every data-carrying subcarrier of the OFDM data signal, and no subcarriers of the combined OFDM signal (no frequency bins of the FFT) are reserved exclusively for a component of the pilot signal.

As shown in FIG. 2, the combined frequency domain signal can be generated such that the OFDM data signal does not include a data-carrying subcarrier at a DC frequency bin of the combined FFT signal and the distributed pilot signal does not include a component pilot signal at the DC frequency bin of the combined FFT signal, i.e., the DC frequency bin (k=0) is not "populated" with a signal and $X(0)=P(0)=0$.

As suggested by FIG. 2, the magnitude of the OFDM data signal $R_D$ is the same in each data-carrying OFDM subcarrier (FFT bin), i.e., constant across all data-carrying OFDM subcarriers, and the magnitude of the pilot signal $R_P$ is also constant across all data-carrying OFDM subcarriers. Further, the magnitude of the pilot signal $R_P$ is a selected, constant fraction α of the magnitude of the data signal $R_D$ ($R_P=\alpha R_D$) in each data-carrying subcarrier. Note that, in the case of phase shift keying modulation, the phases of the data and pilot signals in each frequency bin are not necessarily the same, such that the overall magnitude of the combined signal in each frequency bin, resulting from the vector sum of the data and pilot signals, varies as a function of the particular phases of the data and pilot signals.

To produce a symmetric spectrum of populated frequency bins in the frequency domain (but not necessarily symmetrically populated with the same data), both a constituent data signal and a component pilot signal are present in a same number of positive frequency bins and negative frequency bins of the combined FFT signal such that the number of frequency bins carrying the OFDM data signal and the distributed pilot signal is symmetric about the DC frequency bin of the combined FFT signal. In the example of a 16-point FFT shown in FIG. 2, this results in bins 1 through 7 and −1 through −7 being populated with data and pilot signals, while bin −8 is left empty ($X(-8)=P(-8)=0$) along with the DC bin (k=0). More generally, in an N-point FFT, the k=−(N/2) frequency bin can be left empty to achieve this result.

To transmit the OFDM signal, the combined frequency domain signal $Y_T(k)$ is operated on by an IFFT to produce a sequence of data signal samples in the time domain that can be processed for transmission. For an N-point FFT, each IFFT output constitutes an OFDM symbol having N time-domain samples, and an OFDM message includes a sequence of such symbols along with overhead such as cyclic prefixes, etc. In the described technique, the distributed pilot signal can be added to each symbol being transmitted.

A time-domain signal generated by performing an inverse FFT on an FFT signal is by its nature band limited. The samples of the time-domain symbols produced by the IFFT can be further band limited by leaving the highest frequency bins of the FFT empty and populating only lower-frequency FFT bins with OFDM subcarriers. Specifically, a band-limited OFDM signal and a band-limited distributed pilot signal can be constructed by assigning data subcarriers and component pilot signals to frequency bins 1 to Q and −1 to −Q, where Q is a positive integer less than N/2. In the example shown in FIG. 2, this further band limiting could be accomplished, for example, by leaving frequency bins 7 and −7 empty along with frequency bins 0 and −8 (i.e., Q=6).

The technique described herein for removing a band-limited distributed pilot from a received OFDM signal essentially involves determining what portion of the received signal is attributable to the pilot signal and using that information along with the known pilot waveform structure to remove the pilot signal from the OFDM signal, thereby effectively separating the OFDM data signal and the distributed pilot signal that are contained within the received OFDM signal. This scheme takes advantage of the symmetry found in the constellation of possible signal states of an OFDM signal to determine the magnitude of the distributed pilot signal within the OFDM signal.

For purposes of illustrating the pilot signal removal technique, a specific example is described in which both the OFDM data signal and the distributed pilot signal are modulated using quadrature phase shift keying (QPSK). It will be appreciated that the pilot signal removal technique is not limited to this particular modulation scheme and has applicability in any of a variety of other modulation schemes.

Figure 3:
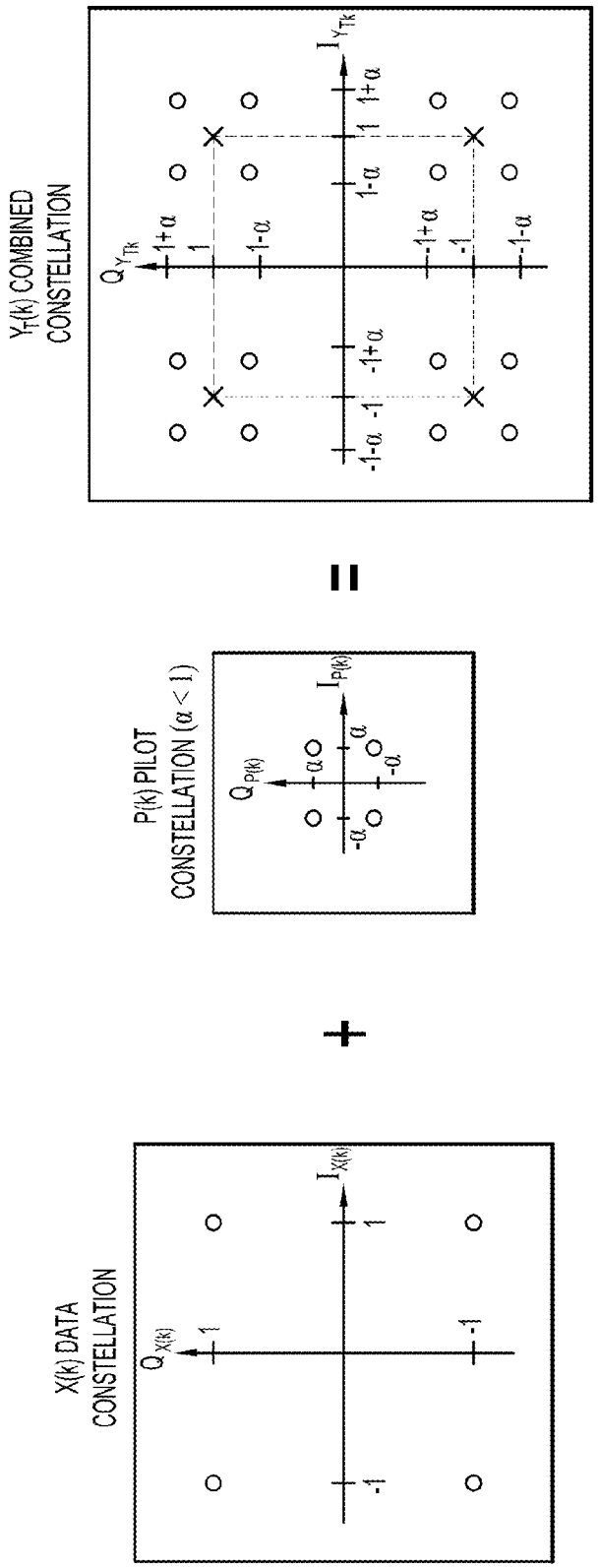
FIG. 3 is a set of graphs illustrating QPSK signal constellations for an OFDM data signal, a distributed pilot signal, and the combined data and pilot signals.

A baseline QPSK signal constellation for each subcarrier of the OFDM data signal (i.e., the data signal in each populated frequency bin of an FFT) is shown in the graph on the left hand side of FIG. 3. The complex subcarrier data signal has a real (in phase (I)) component $I_{X(k)}$ and an imaginary (quadrature (Q)) component $Q_{X(k)}$ that are respectively represented on the X and Y axes of the graph, where:

$$X(k)=I_{X(k)}+jQ_{X(k)} \quad (2)$$

For purposes of description, the magnitudes of the I and Q components of the subcarrier data signal $I_{X(k)}$, $Q_{X(k)}$ are normalized to unity, and the phase of the subcarrier data signal can assume the value of one of four constellation points to represent four possible signal states (i.e., both $I_{X(k)}$ and $Q_{X(k)}$ can take the values of 1 or −1 to produce four possible states (1+j, −1+j, −1−j, and 1−j) corresponding to phase values of π/4, 3π/4, 5π/4, and 7π/4. The vector magnitude of each QPSK data symbol, under these assumptions, is:

$$|X(k)|=\sqrt{(\pm 1)^2+(\pm 1)^2}=\sqrt{2} \quad (3)$$

The corresponding power of each QPSK data symbol, again under these assumptions, is:

$$|X(k)|^2=2 \quad (4)$$

In each FFT bin, the component of the distributed pilot signal also has a QPSK signal constellation P(k), where, as shown in the graph in the center of FIG. 3:

$$P(k)=I_{P(k)}+jQ_{P(k)} \quad (5)$$

The magnitudes of the I and Q components of the pilot signal component ($I_{P(k)}$, $Q_{P(k)}$) are controlled by the transmitter to have a magnitude of α relative to the normalized magnitude of the data signal, where α is a constant less than one, such that:

$$|P(k)|=\alpha|X(k)| \quad (6)$$

Like the data subcarrier signal, the pilot signal components can assume four possible phase values (constellation points) to represent four possible signal states (α+jα; −α+jα; −α−jα; and α−jα). The magnitude and power of each QPSK pilot symbol, under the previous QPSK data symbol assumptions is:

$$|P(k)|=\alpha\sqrt{2} \quad (7)$$

$$|P(k)|^2=2\alpha^2 \quad (8)$$

The ratio of pilot symbol power to data symbol power is $\alpha^2$, as desired:

$$\frac{|P(k)|^2}{|X(k)|^2}=\frac{2\alpha^2}{2}=\alpha^2 \quad (9)$$

Thus, each populated frequency bin k of an FFT contains the components of the complex data signal $X(k)=I_{X(k)}+jQ_{X(k)}$ and the components of the complex pilot signal $P(k)=I_{P(k)}+jQ_{P(k)}$ such that:

$$Y_T(k)=(I_{X(k)}+I_{P(k)})+j(Q_{X(k)}+jQ_{P(k)}) \quad (10)$$

By knowing both α and P(k), the receiver can recover X(k) from the received FFT bins by substantially removing the P(k) bin components from the sum of X(k)+P(k). The value of α is known by design, and P(k) can be known, for example, by time-based synchronization.

As shown in the graph on the right hand side of FIG. 3, since each populated FFT bin of the OFDM signal in the frequency domain includes the sum of a data subcarrier X(k) and a distributed pilot signal component P(k), the signal constellation for the combined signal $Y_T(k)$ ($Y_T(k)=X(k)+P(k)$) consists of sixteen possible states for the components of $Y_T(k)$ ($I_{Y(k)}$, $Q_{Y(k)}$), which represent the sixteen possible vector sums of the four data signal states and the four pilot signal states, where $Y_T(k)$ is given by equation (10). Essentially, based on the combinations of the two possible states for each of $I_{X(k)}$, $I_{P(k)}$, $Q_{X(k)}$, and $Q_{P(k)}$, the constellation includes four "clouds" each having four possible states (shown as circles), with one cloud in each of the four quadrants. Each of these clouds is centered about one of the four possible signal constellation states of the data signal (each denoted by "X" in the rightmost graph of FIG. 3). Importantly, due to the characteristics of the pilot signal structure, each of the four states in each cloud is equally likely to occur. In this case, given a specific value of the data signal, the probability of each constellation point in its "cloud" occurring is one-fourth. Consequently, the average value of the four states in each cloud has a center of mass that coincides with the "X" at the center of the cloud, which is equivalent to the position of the constellation point of the data subcarrier signal. That is, for each "cloud" in the combined signal constellation, the average value of the constellation states is equal to the magnitude of the constellation state of only the underlying data subcarrier signal (i.e., without the pilot signal). This symmetric characteristic of the combined signal constellation enables determination of the magnitude of the pilot signal at the receiver using averaging, as described below.

Figure 4:
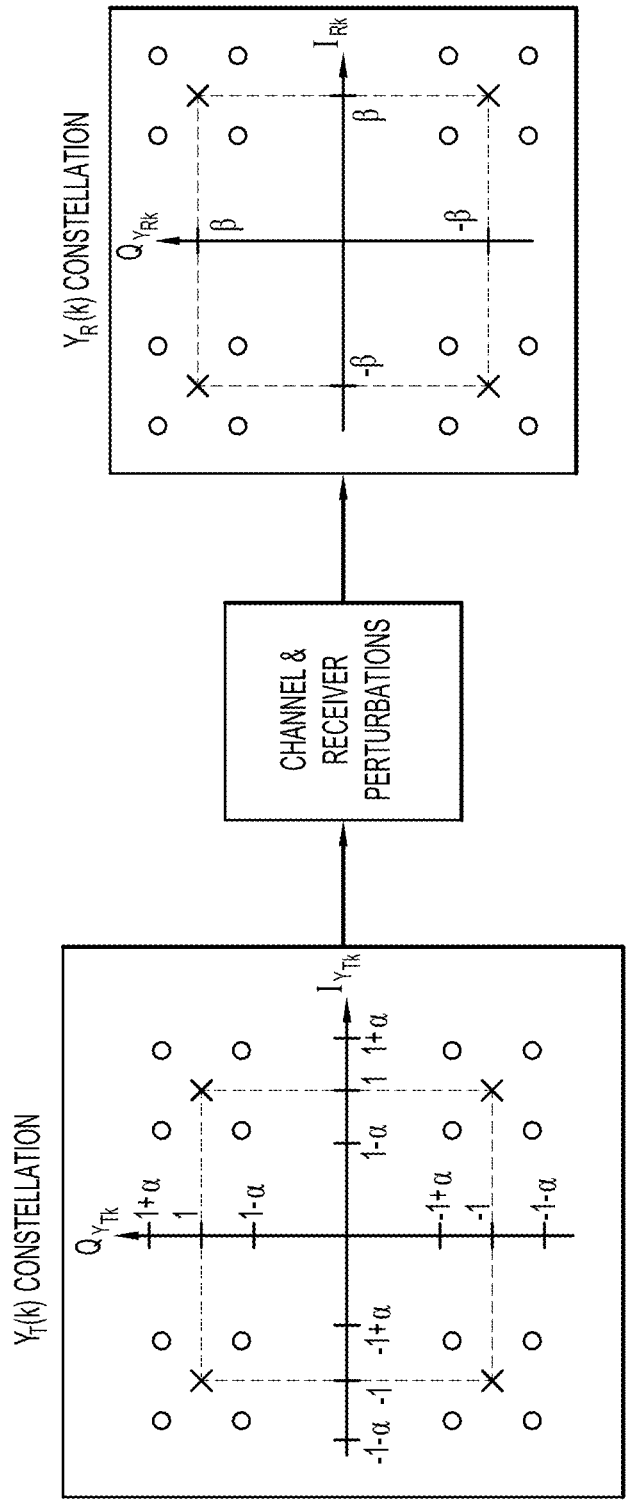
FIG. 4 illustrates the QPSK signal constellation for the combined data and pilot signals at the transmitter and at the receiver.

As shown in FIG. 4, the transmitted OFDM signal experiences channel and receiver perturbations. Typically, the signal channel introduces additive white Gaussian noise (AWGN) to the OFDM signal and multipath interference. The receiver scales the received OFDM signal due to processing requirements by some nominal scale factor β and, taking into account noise introduced via the signal channel, the received frequency domain OFDM signal $Y_R(k)$ in each frequency bin is given by:

$$Y_R(k)=\beta[X(k)+P(k)]+\text{noise} \quad (11)$$

The graph on the right hand side of FIG. 4 shows the scaled, combined signal constellation at the receiver relative to the receiver scale factor β, which reflects the magnitude of the frequency domain signal processed at the receiver. The actual value of the scale factor β is initially unknown, since both noise and hardware variations (e.g., stage gain variation, automatic gain control setpoint variation, etc.) introduce random perturbations in this nominal scale factor.

As is evident from the rightmost graph of FIG. 4, the value of the scale factor $\beta$ corresponds to the average magnitudes of the components of the combined signal ($I_{Y(k)}$, $Q_{Y(k)}$) or, equivalently, the magnitudes of the components of only the data subcarrier signal (without the pilot signal contribution). By estimating the value of $\beta$, the magnitude of the data signal in each FFT bin and, hence, the magnitude of the pilot signal (which is a predetermined fraction of the magnitude of the data signal) can be determined.

Figure 5:
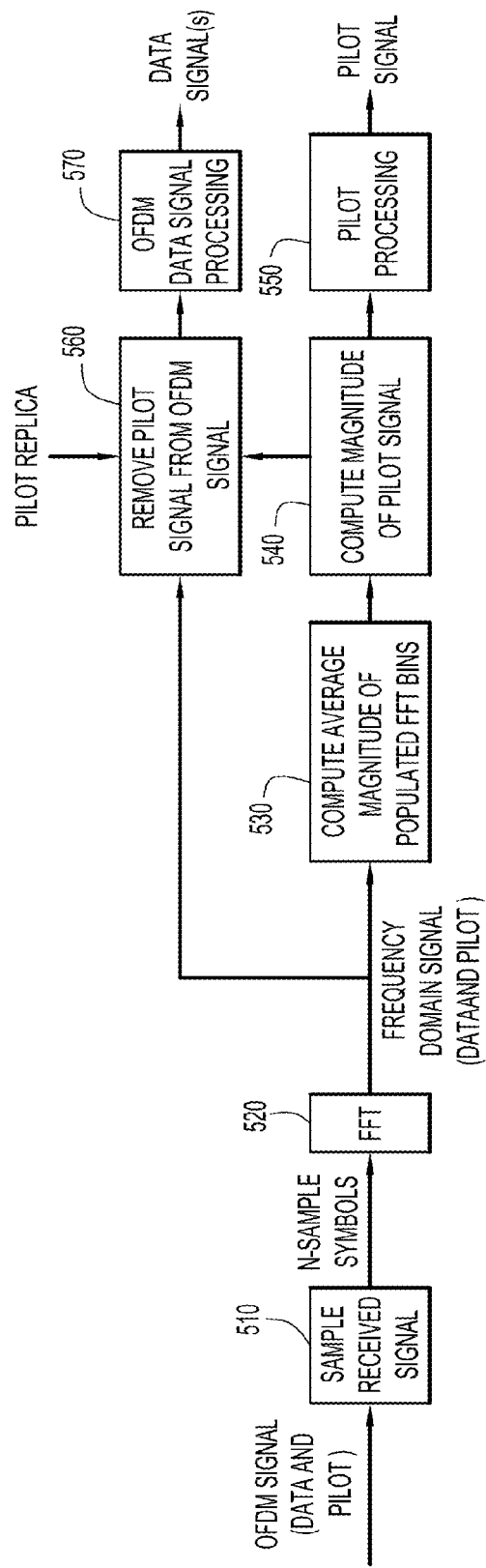
FIG. 5 is a detailed block diagram illustrating receiver components/operations for removing a band-limited distributed pilot signal from a received OFDM signal.

An example implementation of the pilot signal removal technique will be described in detail in connection with the block diagram of FIG. 5. A received OFDM signal $Y_R(k)$ containing both an OFDM data signal $X(k)$ and a distributed pilot signal $P(k)$ is sampled (510), for example by an A/D converter, and an FFT (520) is performed on the samples to produce a frequency domain signal containing the data and pilot signals. According to one approach, each symbol of the received data signal can have a length of N samples, such that each N-point FFT constitutes a frequency domain representation of a single, N-sample symbol. However, the technique is not limited to this particular implementation.

Figure 6A:
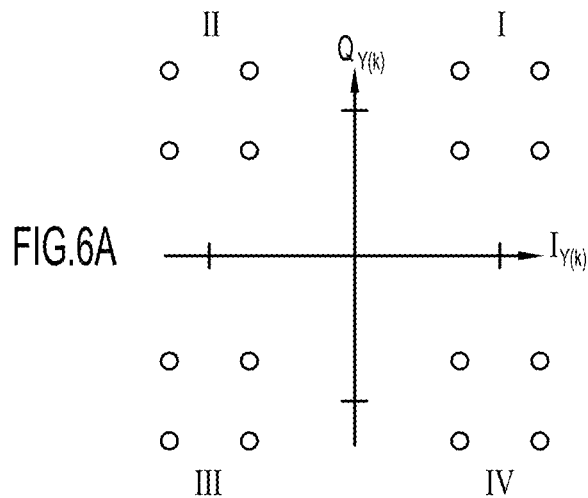
FIGS. 6A-6C are a set of graphs illustrating the effect of evaluating the absolute value of received OFDM signals in the frequency domain in the process of determining the magnitude of the band-limited distributed pilot signal.
Figure 6B:
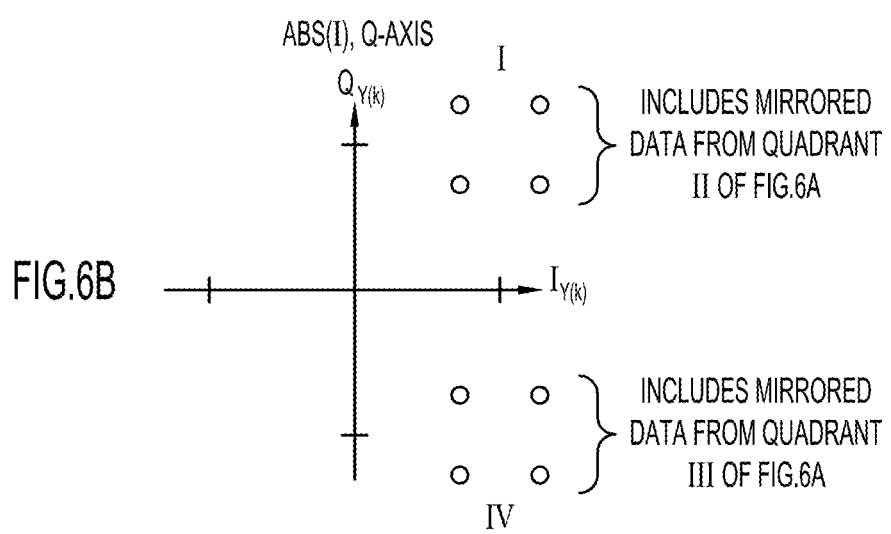
Figure 6C:
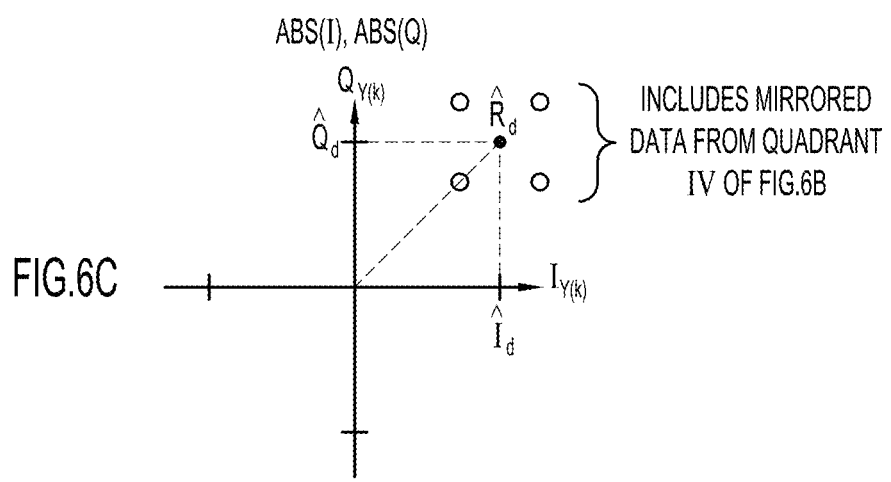

A copy of the frequency domain signal is processed to compute the average magnitude of the populated frequency bins of the frequency domain signal (530). Conceptually, this averaging exploits the I and Q symmetries in the signal constellation of the frequency domain signal. More specifically, as illustrated in the sequence of graphs shown in FIGS. 6A-6C, taking the absolute values of the I and Q components ($I_{Y(k)}$, $Q_{Y(k)}$) of the frequency domain signal essentially folds all of the signal values into the first quadrant. FIG. 6A shows the complete signal constellation, which in this example using QPSK modulation for the data and pilot includes 16 points arranged in four clouds of four points with one cloud in each quadrant, as previously described. For each populated FFT bin, by taking the absolute value of the in-phase (real) component $I_{Y(k)}$, any values in quadrant II are mirrored into quadrant I and any values in quadrant III are mirrored into quadrant IV, as shown in FIG. 6B. By further taking the absolute value of the quadrature (imaginary) component $Q_{Y(k)}$, any values in quadrant IV in FIG. 6B are mirrored into quadrant I, as shown in FIG. 6C.

Determining the absolute value can be implemented digitally simply by making any negative values positive. Folding the signals into one quadrant in this manner effectively creates a single "cloud" whose center of mass corresponds to the magnitude of the OFDM data signal and is located at the coordinates ($\beta$, $\beta$) (see FIG. 4). This center point ($\beta$, $\beta$), which can be denoted by $D_n$ has a radius $R_d$ from the origin which is the magnitude of just the OFDM data signal.

The coordinates ($\beta$, $\beta$) of the center point $D_n$ can be estimated ($\hat{\beta}$, $\hat{\beta}$) as the averages of the absolute values of the I and Q components of the complex signals in the populated bins of the FFT.

$$(\hat{\beta},\hat{\beta})=\text{Avg}[(I_{Y(k)},Q_{Y(k)})]=(\hat{I}_Y,\hat{Q}_Y) \quad (12)$$

More specifically, the average of $I_{Y(k)}$ ($\hat{I}_Y$) is computed as the mean of the absolute values of the I components ($I_{Y(k)}$) of the populated bins in an FFT, and the average of $Q_{Y(k)}$ ($\hat{Q}_Y$) is computed as the mean of the absolute values of the Q components ($Q_{no}$) of the populated bins in the FFT. The estimated magnitude of $D_n$ ($\hat{R}_D$) in the received signal can essentially be computed as a radius in polar-coordinates by:

$$\hat{R}_D=\sqrt{\hat{I}_Y^2+\hat{Q}_Y^2} \quad (13)$$

which is the average magnitude of the populated frequency bins of the FFT. Thus, the average is taken on an FFT-by-FFT basis (in this case, a symbol-by-symbol basis). Of course, averaging can be performed over more than a single FFT (plural symbols), depending on the receiver architecture and/or the pilot signal structure.

Referring again to FIG. 5, once the average magnitude of the populated FFT bins has been computed, the magnitude of the pilot signal can be estimated from the known relationship between the OFDM data signal magnitude and the pilot signal magnitude (540). Specifically, the magnitude of the pilot signal equals a fractional magnitude of the data signal:

$$\hat{R}_P=\alpha\hat{R}_D \quad (14)$$

Thus, an estimate of the pilot signal magnitude ($\hat{R}_P$) is given by:

$$\hat{R}_P=\sqrt{\hat{I}_P^2+\hat{Q}_P^2}=\alpha\sqrt{\hat{I}_Y^2+\hat{Q}_Y^2} \quad (15)$$

As previously described, the value of $\alpha$ is set in the transmitter and known by design, and the estimated magnitude of the OFDM data signal $\hat{R}_D$ is computed according to equation (13), so the estimated magnitude of the pilot signal $\hat{R}_P$ can readily be determined.

In 560, the pilot signal is removed from the frequency domain OFDM signal to recover the OFDM data signal. Conceptually, this operation can be understood by considering equation (11) again ($Y_R(k)=\beta[X(k)+P(k)]+\text{noise}$). A noisy, scaled version of the OFDM data signal can be estimated using the estimated scale factor $\hat{\beta}$ to subtract a properly scaled copy of the pilot signal $P(k)$ from the received frequency domain signal $Y_R(k)$:

$$\widehat{\beta X(k)}+\text{noise}=Y_R(k)-\hat{\beta}P(k) \quad (16)$$

More specifically, the pilot signal $P(k)$ that is transmitted on each of the subcarriers is known in advance at the receiver, and a replica of the pilot signal represented in the frequency domain is stored in advance for correlation purposes. This pilot replica reflects the phase state of the pilot signal on each subcarrier (each will be one of four possible values 1+j, 1−j, −1+j, −1−j). However, the stored pilot replica $P(k)$ has a nominal or normalized amplitude and does not reflect the scaled amplitude $\beta$ of the distributed pilot signal, since this information is not known in advance. The appropriate scaling of the stored pilot replica is provided by the computation of the magnitude of the pilot signal (540). In this manner, both the pilot phase and magnitude are available, and the normalized values of the stored pilot replica can be scaled to accurately estimate the portion of the received signal that is attributable to the pilot signal. By removing this pilot contribution from the received signal, the remaining portion of the received signal provides a faithful estimate of the OFDM data signal.

By way of example, removal of the pilot signal can be mechanized as follows. The estimated magnitudes of the I and Q components of the pilot signal ($\hat{I}_P$, $\hat{Q}_P$) are readily determined from the computed averages of the absolute values of the I and Q components of the complex signals in the populated bins of the symbol FFT ($\hat{I}_Y$, $\hat{Q}_Y$) based on the magnitude original scaling of the magnitudes of the data and pilot signals set in the transmitter:

$$\hat{I}_P=\alpha\hat{I}_Y, \hat{Q}_P=\alpha\hat{Q}_Y \quad (17)$$

Thus, the values $\hat{I}_P$ and $\hat{Q}_P$ can be applied to the I and Q components of the pilot replica to yield the scaled pilot signal to be removed from the frequency domain representation of the received signal. Referring again to FIG. 5, once the OFDM data signal is identified by removal of the pilot signal, the data signal can be further processed (570) to recover the information contained therein. Further, the pilot signal information can be processed (550) to estimate channel characteristics.

While the foregoing techniques for determining the average magnitude of the populated frequency bins and estimating the pilot signal magnitude involve operating primarily with signal magnitudes (voltages) in the frequency domain, given that power is the square of magnitude, it will be appreciated that at least some of the operations for determining the average magnitude of the populated frequency bins and estimating the pilot signal magnitude can be implemented by operating on a power representation of the OFDM signal rather than a voltage representation. However, in either case, the practical result is that the average magnitude of the populated frequency bins is in effect determined, and based on the known relationship between the data and pilot signals, the replica pilot signal can be appropriately scaled and removed from the received OFDM signal.

Figure 7:
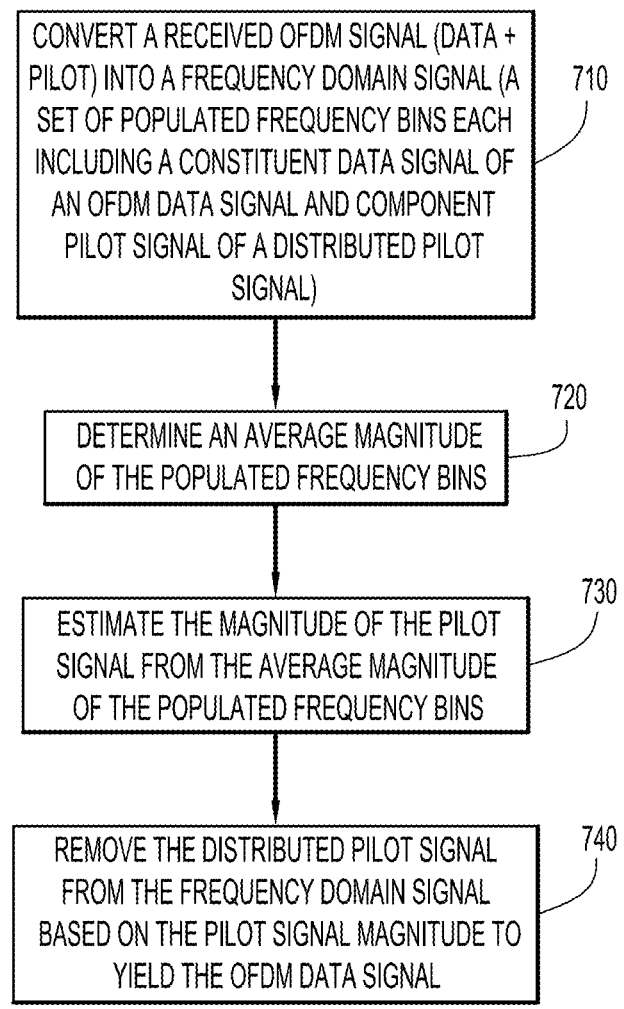
FIG. 7 is a functional flow diagram illustrating operations performed to remove a band-limited distributed pilot signal from an OFDM signal in the frequency domain.

Operations performed by a receiver system for carrying out the technique described herein are summarized in the flow diagram of FIG. 7. In operation 710, a received OFDM signal containing an OFDM data signal and a distributed pilot signal is converted into a frequency domain signal (e.g., via an FFT operation). Specifically, each of a set of populated frequency bins of the frequency domain signal (data-carrying subcarriers of the OFDM data signal) includes a constituent data signal of the OFDM data signal and a component pilot signal. The average magnitude of the populated frequency bins of the frequency domain signal is determined in operation 720 (over a single FFT, for example). The magnitude of the pilot signal is then determined from the average magnitude of the populated frequency bins (operation 730). In particular, since the constellation of possible pilot signal values comprises clusters of values centered about each possible data signal value, by summing the magnitudes (absolute values) of the FFT samples, the contributions of the constituent pilot signals average out to zero (i.e., cancel each other out), such that the average computed from the sum of magnitudes reflects only the magnitude of the OFDM data signal. The magnitude of the pilot signal is revealed by the computed average, since the magnitude of the pilot signal is a known fraction of the magnitude of the data signal.

In operation 740, the distributed pilot signal is removed from the frequency domain signal using the estimated magnitude of the pilot signal and the known pilot waveform structure, thereby separating the distributed pilot signal from the OFDM data signal. Thereafter, the distributed pilot signal can be processed to determine channel characteristics, and the OFDM data signal can be processed to recover the information contained therein.

In the example provided, in which QPSK modulation is employed for both the data and pilot signals, the "center of mass" or average of each "cloud" in the signal constellation coincides with magnitude of the data signal alone, since the constellation points in the cloud are equally likely to occur and are spaced symmetrically about the data signal constellation point. This arrangement makes it possible to determine the data signal magnitude from the average of the received signals and hence to determine the pilot signal magnitude. This approach can be generalized to other modulation schemes or combinations of modulation schemes in which there is a known relationship between the magnitude of the data signal and the "center of mass" of the "clouds" in the constellation of the combined signal, where the center of mass corresponds to the average position of the constellation points in the cloud weighted by their likelihood of occurring within the pilot signal structure.

The distributed pilot technique described herein can be applied in a variety of commercial and military waveforms to achieve improved robustness in a high-Doppler environment. For example, the existing long term evolution (LTE) waveform and the existing soldier radio waveform (SRW) can be modified to include a distributed pilot scheme as described herein. Due to its distributed nature, the described pilot signal has no significant identifying characteristic and is much less observable (stealthier) than spectrum created by convention pilot signals (e.g., the pilot signal of a standard WiFi signal (802.11) produces "rabbit ears" that are easily observable above the average noise power of the signal).

Having described example embodiments of a new and improved technique for removing a band-limited distributed pilot signal from an OFDM signal, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of removing a distributed pilot signal from an orthogonal frequency division multiplexed (OFDM) signal, comprising:
    converting, via a processor, a received OFDM signal into a frequency domain signal, the received OFDM signal comprising a distributed pilot signal and an OFDM data signal, the frequency domain signal comprising a plurality of populated frequency bins containing respective subcarrier signals each including a constituent data signal of the OFDM data signal and component pilot signal of the distributed pilot signal;
    determining, via the processor, an average magnitude of the populated frequency bins;
    estimating, via the processor, a pilot signal magnitude from the average magnitude of the populated frequency bins; and
    removing, via the processor, the distributed pilot signal from the frequency domain signal based on the pilot signal magnitude to yield the OFDM data signal.

2. The method of claim 1, determining the average magnitude comprises:
    computing an average of absolute values of in phase components of the subcarrier signals in the populated frequency bins;
    computing an average of absolute values of quadrature components of the subcarrier signals in the populated frequency bins; and
    computing the average magnitude of the populated frequency bins from the average of the absolute values of the in phase components of the subcarrier signals and the average of the absolute values of the quadrature components of the subcarrier signals.

3. The method of claim 1, wherein the average magnitude of the populated frequency bins comprises an estimate of an OFDM data signal magnitude within the received OFDM signal.

4. The method of claim 3, wherein the pilot signal magnitude is a predetermined fraction of the OFDM data signal magnitude, and wherein estimating the pilot signal magnitude comprises scaling the average magnitude of the populated frequency bins in accordance with the predetermined fraction.

5. The method of claim 1, wherein removing the distributed pilot signal from the frequency domain signal comprises scaling a stored replica of the distributed pilot signal in accordance with the pilot signal magnitude.

6. The method of claim 1, wherein a magnitude of the pilot signal is the same in each of the populated frequency bins.

7. The method of claim 1, wherein each of the distributed pilot signal and the OFDM data signal is modulated via phase shift keying (PSK).

8. An apparatus for removing a band-limited distributed pilot signal from an orthogonal frequency division multiplexed (OFDM) signal, comprising:
a processor configured to:
convert a received OFDM signal into a frequency domain signal, the received OFDM signal comprising a distributed pilot signal and an OFDM data signal, the frequency domain signal comprising a plurality of populated frequency bins containing respective subcarrier signals each including a constituent data signal of the OFDM data signal and component pilot signal of the distributed pilot signal;
determine an average magnitude of the populated frequency bins;
estimate a pilot signal magnitude from the average magnitude of the populated frequency bins; and
remove the distributed pilot signal from the frequency domain signal based on the pilot signal magnitude to yield the OFDM data signal.

9. The apparatus of claim 8, wherein the processor is further configured to:
compute an average of absolute values of in phase components of the subcarrier signals in the populated frequency bins;
compute an average of absolute values of quadrature components of the subcarrier signals in the populated frequency bins; and
compute the average magnitude of the populated frequency bins from the average of the absolute values of the in phase components of the subcarrier signals and the average of the absolute values of the quadrature components of the subcarrier signals.

10. The apparatus of claim 8, wherein the average magnitude of the populated frequency bins comprises an estimate of an OFDM data signal magnitude within the received OFDM signal.

11. The apparatus of claim 10, wherein the pilot signal magnitude is a predetermined fraction of the OFDM data signal magnitude, and wherein the processor is further configured to scale the average magnitude of the populated frequency bins in accordance with the predetermined fraction to estimate the pilot signal magnitude.

12. The apparatus of claim 8, wherein the processor is further configured to scale a stored replica of the distributed pilot signal in accordance with the pilot signal magnitude to remove the distributed pilot signal from the frequency domain signal.

13. The apparatus of claim 8, wherein a magnitude of the pilot signal is the same in each of the populated frequency bins.

14. The apparatus of claim 8, wherein each of the distributed pilot signal and the OFDM data signal is modulated via phase shift keying (PSK).

15. A non-transitory computer readable medium encoded with software comprising processor-executable instructions that, when executed by a processor, cause the processor to perform functions of:
converting a received OFDM signal into a frequency domain signal, the received OFDM signal comprising a distributed pilot signal and an OFDM data signal, the frequency domain signal comprising a plurality of populated frequency bins containing respective subcarrier signals each including a constituent data signal of the OFDM data signal and component pilot signal of the distributed pilot signal;
determining an average magnitude of the populated frequency bins;
estimating a pilot signal magnitude from the average magnitude of the populated frequency bins; and
removing the distributed pilot signal from the frequency domain signal based on the pilot signal magnitude to yield the OFDM data signal.

16. The computer readable medium of claim 15, wherein the instructions for determining the average magnitude comprise instructions for:
computing an average of absolute values of in phase components of the subcarrier signals in the populated frequency bins;
computing an average of absolute values of quadrature components of the subcarrier signals in the populated frequency bins; and
computing the average magnitude of the populated frequency bins from the average of the absolute values of the in phase components of the subcarrier signals and the average of the absolute values of the quadrature components of the subcarrier signals.

17. The computer readable medium of claim 15, wherein the average magnitude of the populated frequency bins comprises an estimate of an OFDM data signal magnitude within the received OFDM signal.

18. The computer readable medium of claim 17, wherein the pilot signal magnitude is a predetermined fraction of the OFDM data signal magnitude, and wherein the instructions for estimating the pilot signal magnitude comprise instructions for scaling the average magnitude of the populated frequency bins in accordance with the predetermined fraction.

19. The computer readable medium of claim 15, wherein the instructions for removing the distributed pilot signal from the frequency domain signal comprise instructions for scaling a stored replica of the distributed pilot signal in accordance with the pilot signal magnitude.

20. The computer readable medium of claim 15, wherein a magnitude of the pilot signal is the same in each of the populated frequency bins.

* * * * *